United States Patent

[11] 3,599,065

[72] Inventors Chester M. Fackler
Lexington;
David H. Lenderking, Versailles, both of, Ky.
[21] Appl. No. 767,760
[22] Filed Oct. 15, 1968
[45] Patented Aug. 10, 1971
[73] Assignee International Business Machines Corporation
Armonk, N.Y.

[54] CONTROL ARRANGEMENT FOR MOTOR TO ESTABLISH HIGH SPEED UNREGULATED OPERATION IN ONE MODE AND REGULATED OPERATION IN ANOTHER MODE
1 Claim, 18 Drawing Figs.

[52] U.S. Cl. .................................................. 318/345
[51] Int. Cl. ................................................. H02p 5/16
[50] Field of Search ........................................ 318/327, 345

[56] References Cited
UNITED STATES PATENTS
| | | | |
|---|---|---|---|
| 3,222,583 | 12/1965 | Gutzwiller | 318/345 |
| 3,234,447 | 2/1966 | Sauber | 318/345 |
| 3,450,973 | 6/1969 | Tobey | 318/345 |
| 3,488,571 | 1/1970 | Tamaki | 318/345 |

*Primary Examiner*—Oris L. Rader
*Assistant Examiner*—Thomas Langer
*Attorneys*—Hanifin and Jancin and D. Kendall Cooper ABSTRACT: The invention concerns motor operating and motor-regulating circuits, particularly set in a dictating and transcribing environment. The circuits insure a fast startup time for the motor whether the conventional AC power source or battery is used. During startup time, the full potential is applied across the motor and at a predetermined speed, the regulating circuit becomes effective to maintain the speed. This action applies during recording and playback operations. During other operations, such as a record media loading and phasing operation and an automatic erase operation, the full power supply is applied across the motor as long as necessary to complete the operation and the regulating circuit remains ineffective. During an automatic recall operation enabling a transcriber to listen to a few previous words of dictated material, connections are made to apply the available potential in an opposite manner across the motor to reverse its direction of rotation and the regulating circuit also remains ineffective. Provision is also made for establishing a relatively high and low speed of operation of the motor to achieve 10 and 20 minute recording times, respectively. The rapid startup time permits a direct coupling of the motor to the driving mechanisms and elimination of an intermediate clutch assembly.

PATENTED AUG 10 1971 3,599,065
SHEET 1 OF 7
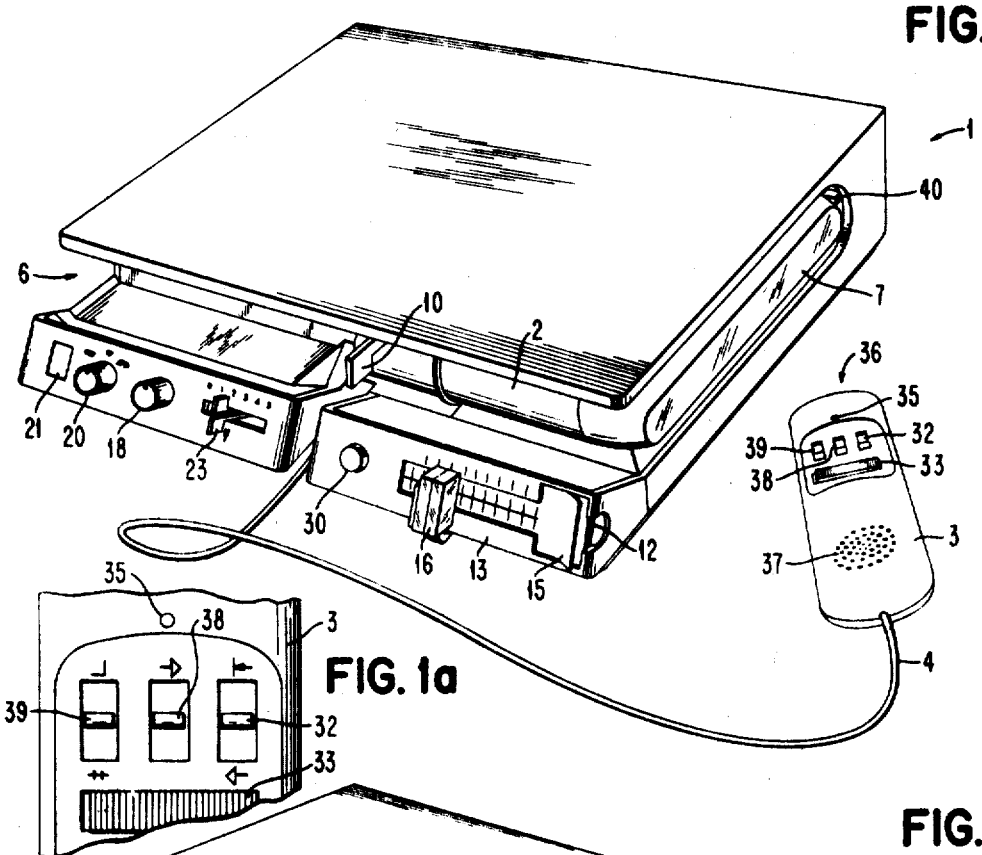
FIG. 1
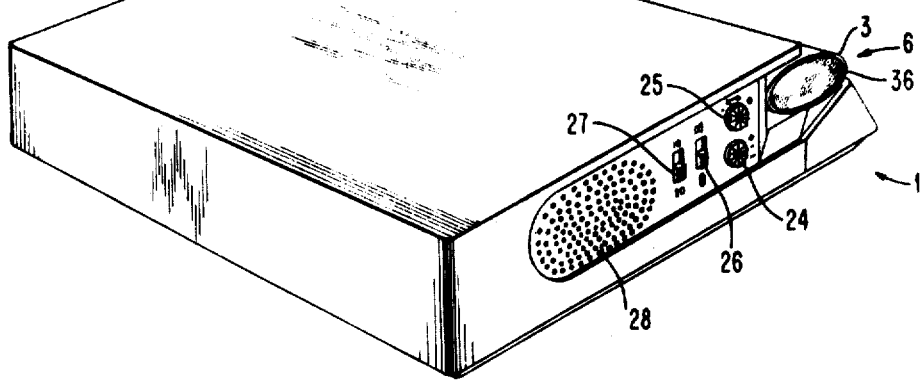
FIG. 1a
FIG. 2
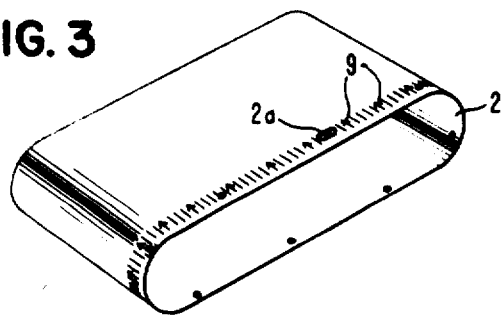
FIG. 3
INVENTORS
CHESTER M. FACKLER
DAVID H. LENDERKING
BY D. Kendall Cooper
ATTORNEY

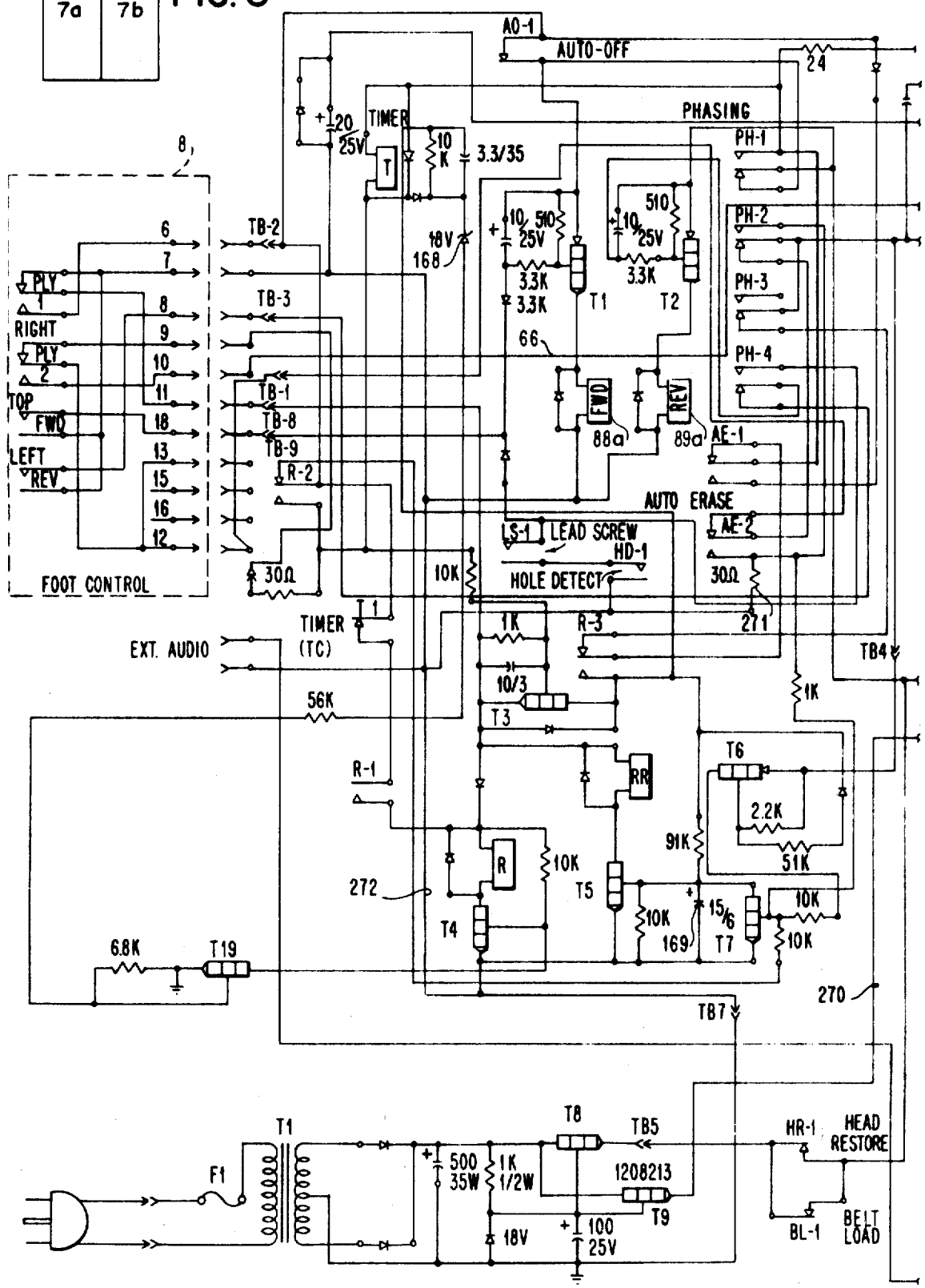

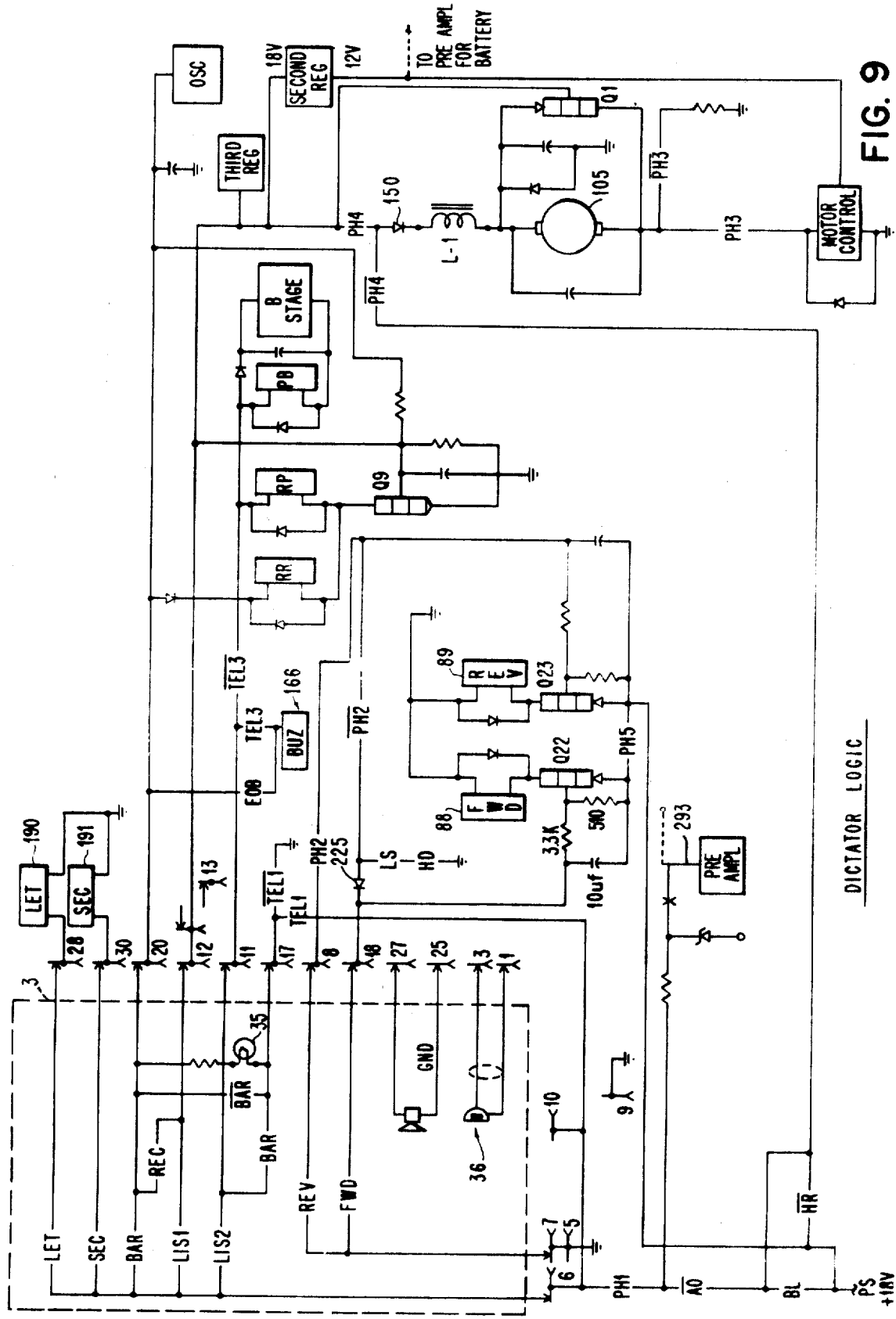

3,599,065

CONTROL ARRANGEMENT FOR MOTOR TO ESTABLISH HIGH SPEED UNREGULATED OPERATION IN ONE MODE AND REGULATED OPERATION IN ANOTHER MODE

CROSS-REFERENCES TO RELATED PATENTS AND APPLICATIONS

U.S. Pat. 3,222,460, N. J. Albanes, et al., inventors; entitled "Multiple Station Selection System."

U.S. application Ser. No. 699,259, filed Jan. 19, 1968, inventors: C. M. Fackler, et al., entitled "Dictating and Transcribing Apparatus with Automatic and Semiautomatic Operator-Controlled Facilities."

U.S. application Ser. No. 699,246, filed Jan. 19, 1968; inventors: J. Cater, et al.; entitled "Dictating and Transcribing Apparatus with Rapid Transducer Alignment and Movement Facilities."

U.S. application Ser. No. 699,253, filed Jan. 19, 1968; inventors: C. L. Ridings, et al.; entitled "Transcribing Apparatus with Variable Automatic Recall Facilities."

U.S. application Ser. No. 767,532, filed Oct. 14, 1968; inventors: F. W. Johnson, et al.; entitled "Dictating and Transcribing Apparatus with Common Operating Mechanisms Differently Oriented and Associated Control Circuits."

U.S. Pat. 3,532,837, issued Oct. 6, 1970; inventors: J. Richard Dyar, et al.; entitled "Headset Featuring Collapsibility for Storage and Expandability for Use."

OTHER REFERENCES

IBM Technical Disclosure Bulleting, May, 1967, Pp. 1776 and 1777, authored by W. F. Wing, entitled "Retractable Cord takeup Reel with Auto-Reset Cord Stop."

Customer Engineering Instruction Manual, Dictation Equipment, IBM Models 211, 212, and 213, form No. 241-5071, dated Oct. 5, 1962.

Reference Manual, Dictation Equipment, IBM Models 211, 212, 213, and 214, form No. 241-5132, dated Oct. 22, 1962.

BRIEF BACKGROUND OF INVENTION, INCLUDING FIELD and PRIOR ART

General

The field of the invention encompasses dictating and transcribing apparatus, particularly those having provision for recording and reproducing sound on a magnetic record media, such as a magnetic belt. Devices of this nature usually have means for operator control of the equipment. Thus, a dictating unit generally has an associated microphone with control buttons and a transcribing unit has a headset and foot control. In addition, assorted warning devices, both audio and visual are provided. Prior art of interest is indicated in the several sections below.

The Albanes, et al., patent noted in the Cross-references section describes a magnetic belt-dictating machine that is also representative of a prior art device of this nature. Comparable apparatus is also described in the Customer Engineering Manual and Reference Manual listed in the "Other References" section above.

Machine Controls and Circuits

Considering the dictating unit, the operator controls permit the establishment of a Record and a Listen mode of operation, together with forward spacing and backspacing in order to review previously dictated material. The transcribing unit generally operates in a Listen mode but also has provision for reviewing various portions of a previously dictated belt. Provision is made in the dictating unit for a Dictating mode, a Conference mode, and a Telephone mode, when required.

Motor Control and Driving Circuits

Provision is made for establishing several motor driving speeds representing 10 minutes or 20 minutes of recording time on the belt. Also, speed regulation is provided controlled by an AC tachometer in the circuit. A typical prior art patent in this area is Green 2,975,349 showing a transistor and including auxiliary means for regulating a potential applied to the motor and thereby the speed of the motor.

Summary

The invention concerns dictating and transcribing apparatus with increased efficiency of operation and improved compatibility. The equipment makes use of magnetic belt-recording media and has provision for semiautomatic belt loading and unloading and initial phasing to insure proper transducer tracking, as set forth in the C. M. Fackler, et al., application Ser. No. 699,259. The same basic belt-handling mechanism is used in the dictating unit and the transcribing unit, differing primarily in the direction of orientation with respect to the operator. Note the F. W. Johnson, et al. application. In the dictating unit, the mechanism is arranged for belt insertion and ejection from the right side of the unit, while in the transcribing unit the mechanism is arranged for a front belt load and unload operation. This arrangement insures both operating and manufacturing efficiencies. Ordinarily, the dictating unit requires a greater number of operator controls than the transcribing unit and the side loading and unloading of the belt permits the arrangement of the primary controls, besides those of the microphone, within easy access range of the dictator.

Both units have circuitry and mechanisms for effecting forward and reverse movement of the transducer in relation to the belt media including a measured review (incremental stepping) as well as a continuous spiral driving relationship in both the forward and reverse directions. The incremental stepping action is repeatable, at the option of the operator. Reference is made to the Cater, et al. application for details of transducer moving facilities. The dictating apparatus has provision for a number of modes of operation including a Dictating mode, a Conference mode, and a Telephone mode, as required. Both the dictating and transcribing units have motor speed regulation and circuits for establishing a plurality of selected speeds of operation. Other features of the invention include a symmetrical forward and backspacing mechanism for effecting incremental stepping of the transducer in relation to the belt; ink marking for indexing purposes, automatic erase of the belt, automatic shutoff near the end of the belt, a retractable microphone or headset (see the Dyar, et al. patent for the headset details), as the case may be, and improved magnetic head and related circuits for insuring high quality sound recording and reproducing. Also, the transcribing unit has an automatic recall mechanism that is adjustable to var; the extent of recall during transcribing operations, as set fort' in the C. L. Ridings, et al., application.

Objects

Accordingly, an object of the invention is to provide dictating and transcribing apparatus with greater flexibility of operation while maintaining effective operator control.

An additional object of the invention is to provide dictating apparatus that is operable on conventional household belt as well as a battery power supply.

Still another object of the present invention is to provide for sound head restoration in connection with belt unloading to insure a proper initial position of the sound head in relation to the media during a subsequent loading operation.

A still further object of the invention is to provide for motor speed regulation and variability and rapid startup time during operation of dictating and transcribing apparatus.

Still another object of the invention is to provide for an automatic erasure of the media at high speeds as well as an automatic shutoff feature that is operable when the end of the media is reached during recording or transcription.

In addition to the foregoing objects, another object of the invention is to provide for a high speed searching operation, as well as a variable incremental scanning operation that is adjustable to accommodate recording time intervals that differ, such as 10 minutes and 20 minutes.

Also, another object of the invention is to provide relay circuitry in equipment of this nature that is normally deenergized during recording operations and that is energized during playback operations, thereby conserving battery power, when such power is used.

Also, an object of the invention is to provide a combination battery condition indicator and a voice modulation indicator for reference by the dictator.

Besides the motor speed regulation, another object of the invention is to provide circuit means for effecting dynamic braking of the motor to stop belt movement rapidly.

An additional object of the invention is to provide an arrangement for rendering a motor-regulating circuit effective during normal motor operation but ineffective during startup time to achieve rapid startup of the motor.

Another object of the invention is to provide for high and low speed operations of a motor as well as reversal, with and without regulation.

The foregoing and other objects, features and advantages of the invention will be apparent from the following more particular description of the preferred embodiments of the invention as illustrated in the accompanied drawings.

DESCRIPTION OF THE DRAWINGS

In the drawings:

FIG. 1 is a perspective view of a dictating unit with associated microphone incorporating a variety of features according to the present invention. FIG. 1a illustrates a number of operator controls on the microphone.

FIG. 2 is a rear perspective view of the dictating unit of FIG. 1.

FIG. 3 illustrates a magnetic recording belt media for use in the dictating unit of FIG. 1. The belt media may also be used in a transcribing unit.

FIGS. 7a and 7b when arranged according to FIG. 8, represent circuitry for the transcribing unit of FIG. 4.

FIG. 9 is a simplified logic diagram of circuit actions in the dictating unit of FIG. 1.

Terminology and Abbreviations

Figure 4:
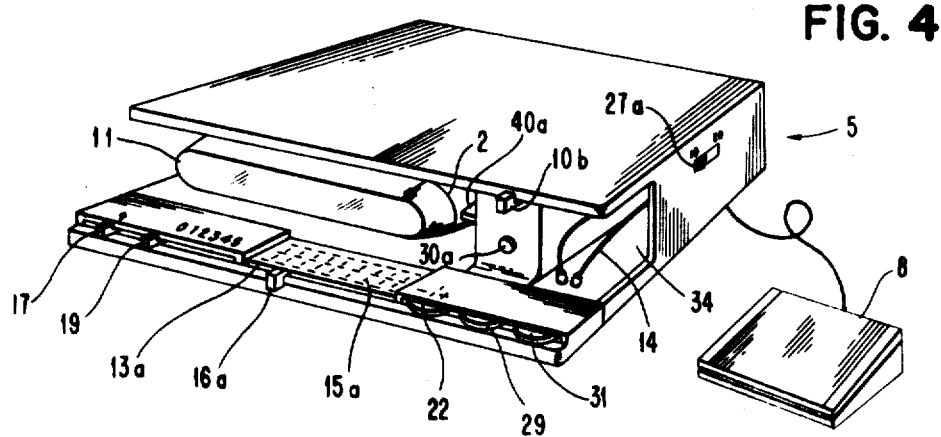
FIG. 4 illustrates a transcribing unit with provision for loading and unloading a belt record media from the front and having an associated headset and foot control.

The following terminology and abbreviations are used in several places in the diagrams of the present case.

| | |
|---|---|
| AE | Automatic Erase |
| Auto Off (AO) | Automatic power shutoff |
| B Stage | Power Amplifier Stage |
| BAR | Dictate (Record) bar on microphone |
| BL | Belt is loaded |
| BUZ | Buzzer |
| CON | Conference |
| DIC | Dictate |
| EOB | End of Belt |
| FWD, F | Forward |
| HOLE | Initial phasing aperture in belt |
| HD | Hole Detect |
| HH | Head is in home position ("O" Index) |
| HR | Head Restore |
| LS | Lead screw contact |
| LET, END LTR, or LTR | Letter indication (index slip) |
| LIS 1, LIS 2 | Listen (Playback) contacts No. 1, No. 2 |
| MOT CONT | Motor Control |
| OSC | Oscillator |
| PB | Playback relay |
| PH1, PH2, etc. | Phase contacts No. 1, No. 2, etc. transferred; Also ∅1, etc. |
| $\overline{PH1}$, etc. | Phase contacts No. 1, etc., not transferred; Also $\overline{\emptyset 1}$, etc. |
| PS | Power Supply |
| R | Relay in transcriber unit |
| RP | Relay in dictator unit |
| RR | Relay in dictator unit (also transcriber unit) |
| RRP | Dictator Foot Control Relay |
| REC | Record mode |
| REG | Regulator |
| REV, R | Reverse (Backstep) or Review |
| SEC | Secretary indication (index slip) |
| Second Regulator | Circuit associated with transistor Q7 |
| SPKR | Speaker |
| STP CONT | Stepping Control |
| SW1 and SW2 | Switches in foot pedal |
| T | Transcriber Relay |
| TACH | Tachometer |
| TEL | Telephone |
| $\overline{TEL}$ | Conference or Dictate |
| TRA | Telephone Recording Attachment |
| X and Y | Wiring connections (P. 2 of 2 |
| ∅ | Phase |

DICTATING UNIT

General Description, Features, Operating Instructions, and Indexing

The dictating unit 1 according to the present invention is shown in FIGS. 1 and 2, which are external views of the units, and FIGS. 4—14f and 17a and 17b, that illustrate various internal mechanisms in the unit. The unit makes use of a magnetic belt record media 2 shown in FIG. 3.

Dictating unit 1, has an associated microphone 3 attached thereto by a cord 4. The cord is retractable by mechanisms to be described. Microphone 3, when not in use, is positioned in a microphone well 6, FIGS. 1 and 2.

Dictating Unit Operating Instructions

For convenience, typical operating instructions for dictating unit 1 are presented below:

Loading the Belt

1. Belt 2 is placed on the machine by sliding it over mandrel 7. The arrows 9 on the belt should point toward the machine. The belt is inserted as far as it will go without forcing it.

2. Belt release lever 10 is moved to the left to complete belt loading.

Removing Belt

Belt release lever 10 is moved to the right to partially extend the belt from the machine for easy removal.

Index Slip Loading and Removal

For loading purposes, a complete pad 12 (25 slips) is inserted in holder 13 by sliding the slips to the left. An individual slip 15 is removed by grasping the right end and sliding it out.

Unit Operating Controls

1. Scanning Lever 16. This lever is used to manually locate sound head to any position on the recording belt.

2. Volume Control 18. Controls range of sound volume during playback.

3. Input Selector Switch 20. This switch is placed in the center position for Dictation. It also has a telephone position (right) and Conference position (left).

4. Voice Modulation Indicator 21. The indicator shows voice or record level. It also serves as a battery indicator for those units equipped with battery.

5. Tunning Lever 23. This lever is normally used for transcribing to adjust the sound head position for proper tracking of soundtrack.

6. Speed Control 24. This control is used by the transcriber to adjust belt reproducing speed slower (−) or faster (+). It is an optional feature.

7. Input Sensitivity Control 25. Rotating this control clockwise (toward large dot) increases the recording level.

Rotating the control counterclockwise (toward small dot) decreases recording level. This is adjusted to give satisfactory record volume with volume control set at the midposition (dot on volume knob at 12 o'clock).

8. Speaker Selector Switch 26. This switch selects microphone playback (lower position) or speaker playback (upper position).

9. Recording Time Selector 27. This switch gives the dictator the choice of 10 (upper) or 20 (lower) minutes of recording time. Normally this switch will be in the 10-minute position.

Microphone

Removing

The microphone 3 is removed by lifting it from the machine and extending the cord 4 by pulling the cord from the machine.

Replacing

The microphone is replaced by depressing the retract button 30 and guiding the microphone into its rest position in microphone well 6.

Operating Controls

1. Dictating. Dictating is begun by placing the record-listen selector button 32 in the Record (upper) position, |←, FIG. 1a. Dictate bar 33 is depressed and the dictator begins speaking across the pickup element 36. When speaking continuously for long periods, dictate bar 33 can be locked into position by depressing and sliding it to the left, FIGS. 1 and 1a. It is unlocked by sliding to the right or moving selector button 32 to the Playback (middle) position. An red lamp 35 on the microphone glows when recording to indicate that the machine is in the record mode.

2. Reviewing. Dictation is reviewed by moving selector button 32 to the Review position, ←, and releasing. The selector is spring loaded to return to a position midway between Record and Review, which is the Playback position. When the speaker selector switch 26 is in the Microphone position (lower), playback is from a speaker 37 located in microphone 3. Otherwise, it is from a speaker 28 in the dictating unit. Each time selector button 32 is moved to the Review position, ←, the sound head in unit 1, moves back into the recorded material on belt 2 approximately 10 words or 6 seconds. As an option, holding selector button 32 in the Review position causes the sound head to move continuously back in 6-second increments. If the recording time selector 27 is in the 20-minute position, each increment is 12 seconds.

3. Forward Spacing. The sound head is advanced by moving the Forward spacing selector button 38 away from the dictate bar. The sound head then moves forward approximately 10 words or 6 seconds. As an option, holding the forward selector up causes the sound head to move forward continuously in 6-second increments. When the Forward selector is operated, the record selector button 32 reverts to the playback mode. If the recording time selector 27 is in 20-minute position, each increment will be 12 seconds.

4. Index Marking. Moving the secretarial selector button 39 away from the dictate bar to the ⌐ position places a red dot, indicating End of Letter, on the top half of index slip 15. Moving the selector toward the dictate bar to the ╫ position places a red dot on the lower half of index slip 15 indicating to the transcriptionist that special instructions are recorded on the belt at that location.

Erasing the Belt

The erase bar 40 is not normally used by the dictator. However, occasionally it may be desirable to completely erase the entire belt. To do this, the erase bar is manually depressed. Since it locks into position, it is not necessary to hold it down. The microphone Record-Listen selector button 32 is placed in the Record or Listen position.

Warning Tone

A warning tone may be generated at various times, any one of which requires some action on the part of the user. These are:

1. Attempting to dictate with the input selector switch 20 in the Telephone mode results in a warning signal. Moving selector switch 20 to the individual Dictate position, o, restores the machine to normal.

2. A short warning tone is generated one minute from the end of the belt. At this time, if dictation is to be continued, the user identifies himself, indicates he is continuing on another belt and places another unused or erased belt on the machine.

3. An end of belt-warning signal is generated 15 seconds before the end of the belt. If the dictator continues to record through this signal, the machine automatically shuts off. If this occurs, the belt must be changed or the scanning lever 16 manually moved to the left.

Belt Loading and Initial Phasing

The apparatus includes mechanism and circuitry that are operable upon insertion of the magnetic belt on mandrel 7, FIG. 1, to rotate the belt to a predetermined initial position, as fully described in the C. M. Fackler case Ser. No. 699,259. This insures that the sound head transducer will track a helical path on the belt beginning at an identical position each time the belt is inserted. Belt 2, FIG. 3, has an elongated aperture 2a that is sensed in the machine during the loading and phasing operation to establish the initial starting position on the belt.

The functions of the belt loading and unloading mechanisms are:

1. Draw the belt into the machine from a partially inserted position by movement of lever 10, FIG. 1 to the left.
2. Accurately position the belt in its running position.
3. Prevent partial loading of belt.
4. Partially eject the belt for easy removal.
5. Retract the idler tension roller and drop the sound head for ease of inserting and removing belt.

Belt Unloading

Upon termination of dictation, belt 2 is ejected from dictating unit 1 by operation of belt lever 10 to the right, FIG. 1.

In the case of the transcribing mechanisms shown in FIG. 4, the belt loading, eject and unloading operation proceeds in a comparable manner to that for the dictating unit. The difference lies primarily in the direction of belt loading and ejection, which in the case of the transcriber is from the front of the unit.

Transcribing Unit

General Description

The transcribing unit is provided with essentially the same basic belt record media handling, loading, ejecting, and phasing mechanisms as are used in the dictating unit with the exception that the mechanisms are oriented to face the transcriber during normal operation for easier loading and unloading operations. The transcribing unit has been selected for particular illustration of the unique motor control and regulating circuits according to the present invention. The transcriber unit is pictured in FIG. 4. Various mechanisms concerned with belt loading and unloading phasing, reverse and forward scanning and other mechanisms are fully described in the various cross-referenced cases. Additional mechanisms concerned with a Word Recall operation are specifically shown in FIG. 5.

As with transcribing units in the prior art, the primary objective of the transcribing unit according to the present invention is to facilitate the transcription of previously recorded media. Operating instructions for the unit are set forth below.

Transcribing Unit Operating Instructions

Loading Belt

1. The belt 2 is placed on the machine by sliding it over the mandrel 11 with the arrows pointing toward the machine. The belt is inserted into the machine as far as it will go without forcing it.

2. The belt release lever 10b is moved to the left to load the belt. Thereafter, the belt rotates at high speed. When it stops it is automatically phased.

Removing Belt

1. Belt release lever 10b is moved to the right. The belt will partially extend from the machine at this time.

2. The belt is then manually removed from the machine. Scanner lever 16a automatically returns to the left margin.

Index Slip Loading and Removal

1. The index slip 15a is inserted into the holder 13a.
2. The slip is slid out of the holder for removal.

Headset

Removing

1. The operator grasps and pulls headset 14 out of the unit a convenient distance. Tension is released on the headset cable allowing the cord to lock into position. (Note the Wing publication and the Dyar, et al., patent.)
2. The earpieces are twisted sideways until they snap into an expanded condition.
3. The earpieces are spread apart to put the headset on.

Replacing

1. The earpieces are pushed together.
2. The earpieces are twisted until they snap into their rest position or until they lie side by side.
3. The headset is held securely in one hand. The rewind button 30a is depressed to retract the headset cable.
4. The headset is guided into the storage compartment.
5. The rewind button 30a is released.

Foot Control

Operating

1. Start-Stop. The right side of the foot control 8 starts the machine when depressed. The machine stops when the right side is released.
2. Review. When the left side of foot control 8 is depressed, the sound head is moved back approximately 10 words or 6 seconds of recording time when the recording time selector 27a is in the 10-minute position. With an optional feature, holding the left side depressed moves the sound head back continuously in 6-second increments, thus giving an extended review. If the recording time selector 27a is in the 20-minute position, the measured review will be 12 seconds or approximately 20 words. For most dictating and transcribing, the switch is in the 10-minute position.
3. Forward Review. Depression of the top of foot control 8 moves the sound head forward approximately 10 words or 6 seconds. With an optional feature, keeping the foot control depressed causes the sound head to advance continuously in 6-second increments. If recording time selector 27a is in the 20-minute position, the forward movement will be in 12-second increments or approximately 20 words.

Unit Operating Controls

1. Tuning Control. Tuning control 17 is not normally used. This control is provided so that belts recorded on other dictating equipment can be transcribed on the present transcriber. If a belt without an initial phasing aperture is placed in the transcriber, the automatic initial tuning feature is not operative. The belt will continue to rotate, but is stopped by tapping the forward review (top) portion of the foot control. Manual tuning can now be accomplished by moving tuning control 17 left or right.
2. Automatic Word Recall. Releasing the right side of foot control 8 activates the auto recall mechanism. This allows the last few words of dictation to be repeated the next time the right side of the foot control is depressed. The amount of recall is adjustable from: No recall to about five (5) words. This feature is adjusted to the amount of recall desired by moving recall lever 19 left or right. The panel is marked in seconds from 0—5 seconds.
3. Scanner Lever. Scanner lever 16a is provided to allow manual locations of the sound head to any position on the belt. Any portion of the recorded information can be reached by pushing the lever toward the machine and sliding left or right. If the right side of foot control 8 is depressed when moving the scanner lever, the transcriber can at the same time listen to what is recorded on the belt. If scanner lever 16a is moved, either manually or by depressing the forward review position of the foot control, to the far right of the index slip area, the transcriber will automatically shut off. The unit is turned back on by manually moving the scanner lever to the left.

4. Speed Control. The playback speed is adjusted by speed control knob 22, which is rotated left or right for adjustment. The speed is decreased by turning it to the left and increased when turned to the right. The dot in the center of the control indicates the middle of the speed range.
5. Tone Control. The tone can be adjusted by control 29. The dot in the center of this control indicates the middle of the range.
6. Volume Control. Volume control 31 varies the loudness of the dictation heard through headset 14. The dot on the knob represents the middle of the volume range.

Erasing the Belt

The erase knob 40a is used to initiate complete erasure of the entire belt after it has been transcribed. This feature is semiautomatic. Once the knob has been depressed, it latches into position, and as soon as the belt has been completely erased, returns to its normal position. The machine stops to indicate the belt has been erased. The erase mechanisms are fully described in the Fackler, et al., case Ser. No. 699,259.

Headset

Headset 14 is positioned for storage in compartment 34 of transcribing unit 5. As described in the Dyar, et al., patent indicated in the "Cross-Reference" section above, headset 14 is collapsible for storage in unit 5 and when withdrawn from the unit is expandable for normal use by the transcriber.

Status of Transcribing Unit Prior to Belt Loading and Phasing

Figure 7B:
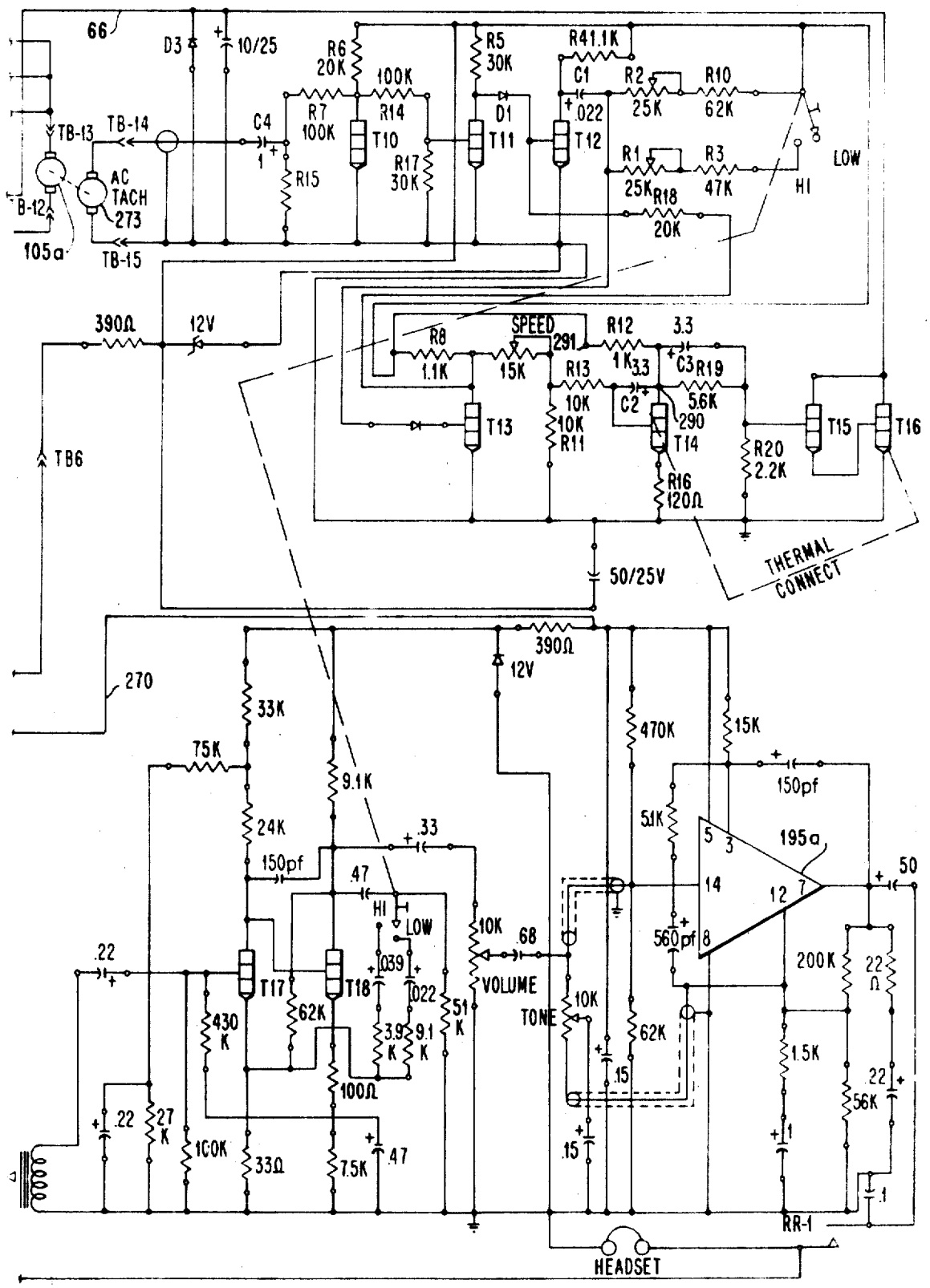

Referring to FIG. 7a, the power cord is assumed to have been inserted in a suitable power outlet with conventional AC potential. This activates the power supply circuit including transistors T8 and T9. Ordinarily, transistor T8 provides power to a large portion of the transcriber circuits. However, at this time the head restore contacts HR-1 and the belt load contacts BL-1 are opened since the head has been restored to the margin location as a result of the previous unloading of a belt and the belt load contacts are not closed since no belt is in position. A branch circuit is established through transistor T9 and by line 270 to certain stages of the amplifier including transistors T17, T18 and the integrated circuit 195a. Also, since no belt has been loaded in the unit, the phasing contacts PH-1 through PH-4 will be in the Not Phase condition which means that the center strap in each case will be transferred to the opposite contacts from what is shown in FIG. 7a. All of the other portions of the transcriber circuits in FIGS. 7a and 7b are inactive.

Preparation for Belt Loading and Phasing

Following removal of the previous magnetic belt 2 from unit 5, the sound head in unit is restored to the home margin in a manner similar to that described in connection with the dictation unit. This is effected by engagement of the sound head with a restore lead screw and the application of power from transistor T8 through the Not Head Restore ($\overline{HR}$) contacts to the motor through the Not Phase 1 ($\overline{PH-1}$) contacts.

Normally, the transcriber selects an index slip 15a that is related to the belt to be transcribed and positions it in the index retainer 13l, FIG. 4. Another belt 2 is then slipped onto mandrel 11 into the transcribing unit as far as it will go. Thereafter, belt lever 10b is moved to the left and belt 2 is pulled into unit 5 onto drive rollers, by a gripper assembly such as that described in the F. W. Johnson, et al., case. Movement of belt lever 10b to the left latches various belt loading and phasing mechanisms and applies power through contacts BL-1 and PH-1 to the motor 105a in the unit to rotate lead screw 100 and belt 2. The lower side of motor 105a is connected to ground through the PH-2 contacts and the 30-ohm resistor 271 by line 272, FIG. 7a.

Action of Motor and Motor Control Circuits During Phasing Operations

The transcriber unit is provided with a motor-regulating circuit shown particularly in FIG. 7b that includes transistors T10 through T16. Under some circumstances, such as normal transcriber playback of previously dictated material, motor 105a drives an AC tachometer 273 that, in turn, provides pulses to the regulating circuit that occur at a rate that is proportional to the speed of the motor for purposes of regulating the motor speed. The motor-regulating circuit is shown in block diagram form in FIG. 11 and will be discussed shortly. During operation of the regulating circuit, transistors T15 and T16 are connected in series with motor 105a by line 66 that is connected to FIG. 7a, to the junction of a connector designated "10" and by a circuitous path through the Auto Erase contacts AE–2 and the normally closed contacts of PH–2 to the lower side of the motor. During the phasing operation, the motor-regulating circuit in the upper portion of FIG. 7b is switched out or disconnected from motor 105a and is ineffective to control motor speed. Instead, as just indicated, the lower side of motor 105a is connected directly to ground through the PH–2 contacts and line 272. The objective of the foregoing switching action is to place the highest potential available from the power supply circuit, that is, in the range of 16.0 to 18.0 volts, across motor 105a to effect a rapid startup of the motor and a high rate of operation. This can be seen by reference to FIG. 13 where the startup time in milliseconds is indicated on the horizontal line vs. the speed in revolutions per minute on the vertical line. Under the present circumstances during phasing, the motor r.p.m. will follow the solid line and continue on up along the dashed line 274.

As soon as lead screw 100 reaches a zero phase condition, contacts LS–1 close and its clutch is disconnected. Belt 2 continues to drive until aperture 2a is sensed by contact assembly HD–1. A circuit is thereupon completed to energize transistor T2 and actuate Reverse magnet 89a to release the mechanisms previously latched and transfer the Phase contacts to the condition shown in FIG. 7a, thereby indicating that the lead screw and belt have been phased to a proper initial position. The unit is thereupon ready for use by the operator and control by appropriate movement of foot control 8.

As indicated in the operating instructions, compatibility of the unit for operation with magnetic belt media having no aperture is achieved by insertion of such media in the unit and depression of foot control 8 to close switches in order to activate Reverse solenoid 89a thereby unlatching the loading and phasing mechanisms and preparing the unit for use.

Status of Motor Circuits Following Completion of the Phasing Operation

Upon completion of the phasing operation, the phasing contacts will assume the conditions shown in FIG. 7a. The transcriber unit is thereupon in a standby condition awaiting depression of foot control 8 and appropriate operation by the transcriber. The transfer of phasing contacts PH–2 to the condition shown in FIG. 7a disconnects the previous connection to ground by line 272 from the lower side of motor 105a and instead connects the regulating circuit at the top of FIG. 7b in series with the motor for appropriate speed regulation.

Typical Transcribing Operation

To transcribe an inserted belt BL–unit 5, the operator positions headset 14 for listening to signals derived during Playback and positions foot control 8 for appropriate depression in the various directions indicated. Depression of the right side of the foot control transfers switches 1 and 2 within the foot control to apply power to the various machine circuits. Power is provided from transistor T8 through the Belt Load BO–1 contacts, Phase 1 contacts, Automatic-Off (AO–1) contacts, connector 6 in the foot control to the lower strap of Playback switch contact 1 in foot control 8. Such transfer applies the power supply potential, which is a nominal 16.0 volts from terminal 6 through the lower set of contacts in switch 1, by terminal 11 and completes a circuit to relay R operated by transistor T4. Relay R is held through its own R–1 contacts and a set of timer contacts TC that are significant in the Automatic Recall operation to be described. Also, the transfer of switch contacts 1 close a circuit for energizing relay RR through transistor T5. The RR–1 contacts complete the amplifier circuit to the headset, FIG. 7b.

In FIG. 7a, the R–3 contacts transfer and potential is applied through these contacts, the Not Automatic Erase contacts ($\overline{AE-1}$) to the upper part of motor 105a. The lower portion of the motor circuit is completed through the Phase 2 contacts, Not Automatic Erase contacts 2 ($\overline{AE-2}$), terminal 112, Playback switch 2, terminal 10 and by line 66 to the motor-regulating circuit and speed control circuit including transistors T10—T16, FIG. 7b.

Motor Regulating Circuits

Figure 11:
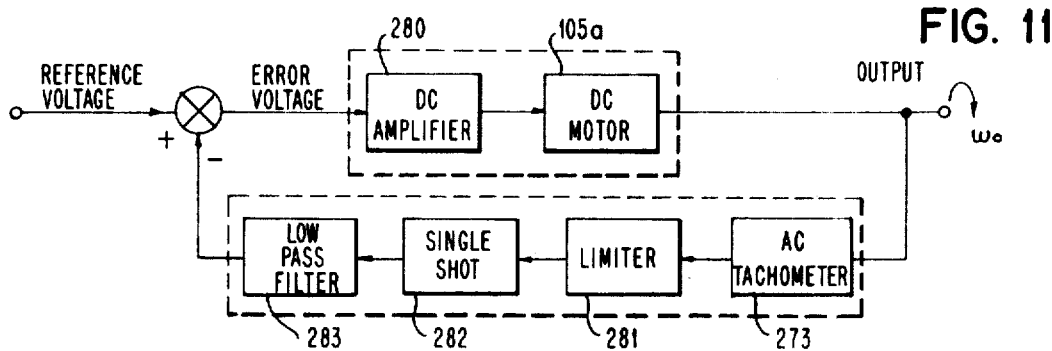
FIG. 11 is a block diagram of a motor-regulating circuit shown in FIG. 7b.

As previously noted, the transcriber unit includes various motor-regulating circuits including T10—T16 shown in FIG. 7b and further including the AC tachometer 273. A block diagram of the motor-regulating circuit is shown in FIG. 11. This represents a simplified version of the motor-regulating circuit and indicates that a voltage representative of motor speed is compared with a reference voltage to develop an error voltage that in turn is provided to the motor circuit for regulation. The block diagram includes the motor 105a driven from an amplifier circuit 280 comprising transistors T15 and T16. Motor 105a in turn drives the AC tachometer 273 and a speed indicated voltage is developed by applying pulses from tachometer 273 through a limiter stage 281, a single shot stage 282, and a low pass filter stage 283. The AC tachometer, being mechanically coupled to the motor 105a, yields a sinusoidal output having a frequency proportional to the speed of the motor shaft. This sinusoidal output is fed through a diode D1, FIG. 7b, into the single shot circuit comprising transistors T12 and T13. The single shot stage produces a pulse of fixed duration for every positive excursion of the input signal. The Miller integrator stage comprising transistor T14 acts as a low pass filter to integrate the pulses into an average DC voltage and to invert the voltage. This DC voltage is affected by both the input to the Miller integrator as well as the supply voltage of the Miller integrator. The supply voltage of the Miller integrator is thus the reference voltage and is held constant in every operating condition. Transistors T15 and T16 comprise a Darlington DC amplifier that is responsive to the DC output voltage from the Miller integrator representative of the error voltage to supply appropriate driving power to the DC motor to regulate its speed. The speed may be varied by (1) varying the portion of the error voltage applied to the Darlington circuit or (2) by varying the period of the single shot which will in turn vary the average DC voltage.

In meeting the requirements of dictation application, a motor control must provide for good steady state speed regulation as well as insure compensation for instantaneous speed variations (wow & flutter). In order to compensate for those instantaneous variations, the time response of the circuit must be able to handle variations of speed in the 6—250 ops. range (wow and flutter range). This motor control circuit can control the steady state speed within ±2 percent over a load range ±30 percent of nominal load. At the same time, it control wow and flutter better than previous systems.

| | Wow (%) | Flutter (%) |
|---|---|---|
| Typical Previous System | 0.25% | 0.8% |
| Disclosed Circuit | 0.1% | 0.5% |

As mentioned above, the wow and flutter of a drive using the disclosed circuit is appreciably better than the wow and flutter in previous systems. The prior art circuits are usually designed for use in tape recorders where large flywheels are used to maintain constant drive speed. These prior circuits are quite capable of maintaining good steady state speed regulation. But they are incapable of handling instantaneous speed variations (wow and flutter) and as a result rely on the large flywheels to smooth out any instantaneous variations. The disclosed circuit has a response that is fast enough to correct these instantaneous variations. It has been established that the disclosed circuit is capable of handling speed variations that occur at a rate from 0 to 15 Hz. By correcting for these variations, the circuit improves the wow and flutter considerably without the use of bulky high inertia drive systems.

Motor Startup and Regulator Action Upon Depression of Foot Control

In order to establish an efficient transcribing operation and preclude the possibility of missing portions of the dictated material, it is essential that startup time be minimized and, in fact, standards have been established in the industry requiring a startup time in dictating and transcribing apparatus at least equal to or better than 50 milliseconds.

The time response of the disclosed motor circuits represents a significant advance in this respect. The fast response bears itself out in two main areas. One is the rapid start time of the motor and the other is the wow and flutter, previously discussed.

Figure 12A:
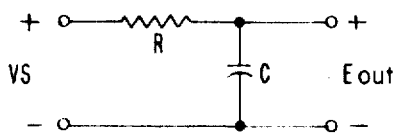
FIGS. 12a, 12b, and 12c illustrate certain principles of operation of the motor control circuits in FIGS. 7a and 7b.
Figure 12B:
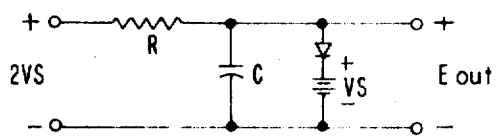
Figure 12C:
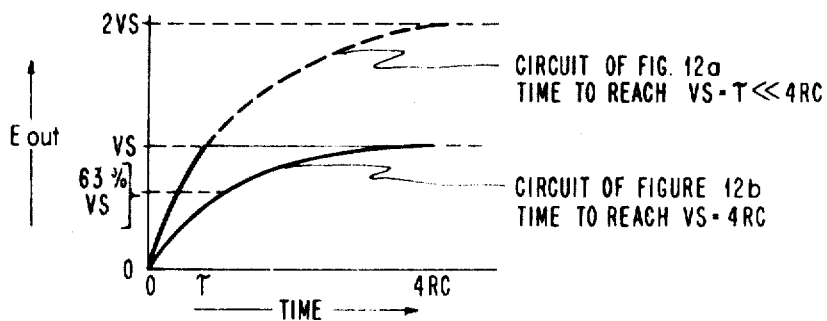

The motor, when operated by a motor circuit, typically starts in 40 milliseconds. To understand this mode of operation of the disclosed motor circuit, it is helpful to draw an analogy between the starting of the motor and the charging of a capacitor. When a capacitor is connected in a circuit as indicated in FIG. 12a, the capacitor charges to 63 percent of the supply voltage (Vs) in one time constant (RC). If it is desirable to reach this voltage in a much shorter time, it is common practice to use a diode clamping technique as shown in FIG. 12b.

Figure 13:
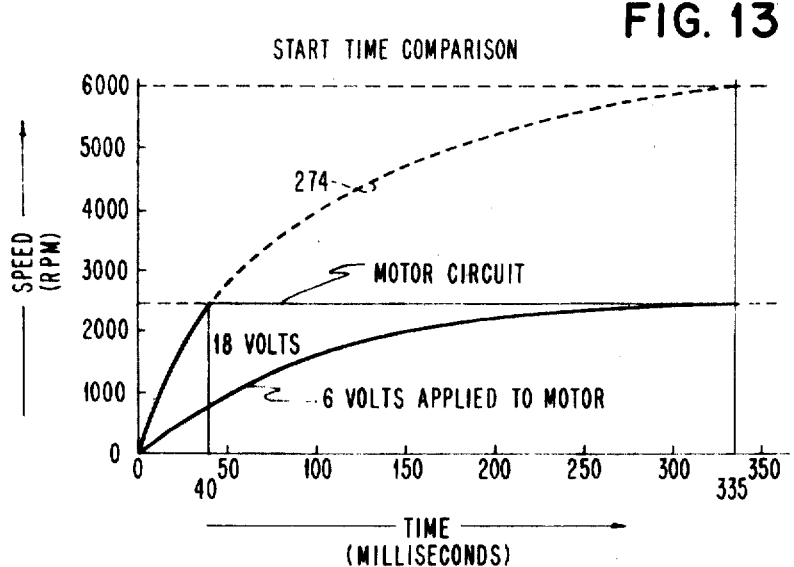
FIG. 13 illustrates motor startup and regulating action.

In a diode clamp circuit, the capacitor begins to charge toward a high voltage but is clamped at the desired voltage. Thus the capacitor is charged to the desired voltage in a shorter time than if the desired voltage was applied by itself. The output voltage vs. time can be compared in FIG. 12c. As plotted in FIG. 12c, the effective time constant with the diode clamp is significantly below that of the actual RC time constant. The motor circuit operates in a similar manner. The power supply to the motor circuit is 16.0 to 18.0 volts. When the motor is running at 2,350 r.p.m. (normal speed) the motor terminal voltage is controlled at approximately 6 volts by the motor circuit. However, when the motor is started from 0 r.p.m. it accelerates toward a high speed equal to the speed it would run if 18 volts were applied to the terminals. As the speed passes through 2,350 r.p.m. the feedback of the motor circuit causes the acceleration to stop and the speed to settle at 2,350 r.p.m. On the other hand, if the circuit applied only the controlled 6 volts to the motor terminals the motor would accelerate toward 2,350 r.p.m. but it would accelerate at a rate controlled by the natural time constant of the motor. FIG. 13 shows the great reduction in the effective time constant.

Upon completion of the circuit to the top side of the motor through contact R3, the startup action of the motor occurs. The rapid startup action involves all of the transistors T10—T16 in FIG. 7b. Initially, as motor 105a starts revolving, it drives tachometer 273 that in turn supplies pulses at a relatively slow rate to transistor T10 and subsequently to transistors T11, T12, and T13. During this period, the rate of the pulses is such that these transistors are oscillating in synchronism with the pulses but insufficient output exists from transistor T13 to affect transistor T14 that remains dormant or inactive. Therefore, with transistor T14 effectively off at this time, the potential at terminal 290 rises and becomes equal to the reference potential at terminal thereby saturating transistors T15 and T16 to drive motor 105a at a high rate of speed. As motor 105a approaches the predetermined desirable speed indicated in FIG. 13, the pulses from tachometer 273 are effective to produce a voltage from transistor T13, activate transistor T14 and render the regulating circuit effective to change the status of transistors T15 and T16 from a saturated state to a regulated state at reduced current levels. That is, the higher the rate of impulses supplied by tachometer 273, the lower the potential at terminal 290 and the lower the current levels through transistors T15 and T16. Thereupon, the regulating circuit is effective to maintain the speed of motor 105a at the predetermined speed indicated in FIG. 13.

Manual Scan Operation

Pushing scanning lever 16a in toward the machine enables movement of the scanner mechanism and magnetic head to any desired position on index slip 15a and with respect to belt 2. The movement of scanning lever 16a operates pawl retract bail 87, FIG. 6a, to disengage pawl assembly 101 from lead screw 100 and permit easy movement of the sound head in the unit.

Figure 6A:
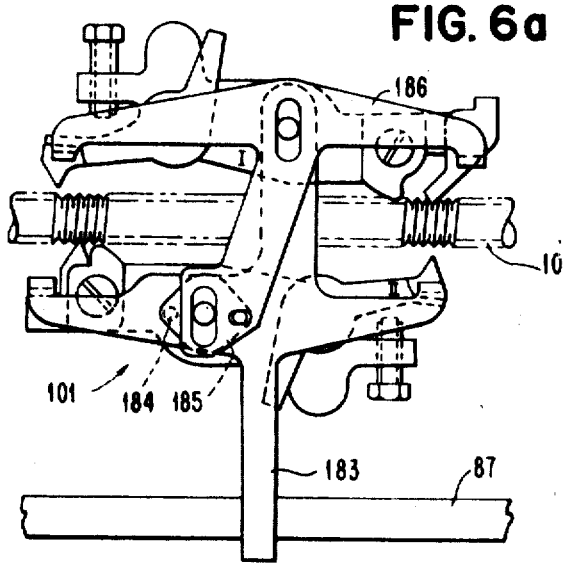
FIGS. 6a and 6b represent engaged and disengaged conditions of forward and reverse pawls in the units.
Figure 6B:
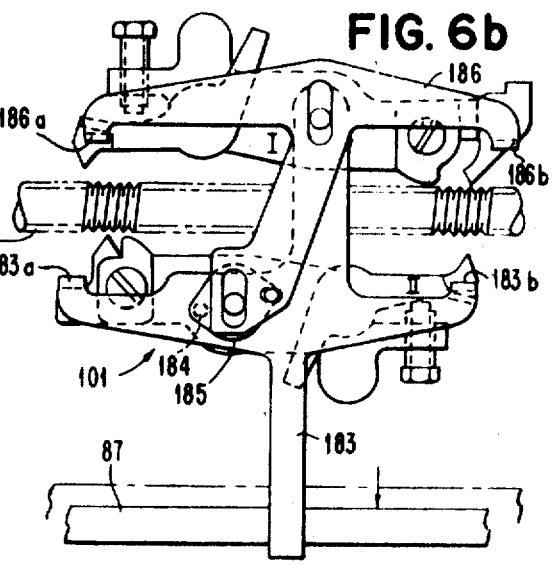

By interconnection shown in FIGS. 6a and 6b, bail 87 operates retractor 183 in a downward direction. Retractor 183 is connected at 184 with a retractor drive 185 that is rotated from the condition shown in FIG. 6a to that shown in FIG. 6b. Such rotation of retractor driver 185 moves retractor 186 upwardly to retract assembly 101 from lead screw 100.

To summarize, movement of pawl retract bail 87 from the normal position of FIG. 6a to the activated position in 6b moves retractor 183 downwardly and retractor 186 upwardly to disengage all pawls from lead screw 100. The actual disengagement is effected by extensions 183a and 183b of retractor 183 and 186a and 186b of retractor 186.

Forward Stepping

It is also possible for the operator to reach a desired portion of belt 2 in the Forward direction by depressing the top portion of foot control 8. This transfers switch contacts designated Forward (FWD) and provides a connection through terminal 18 to saturate transistor T1 thereby activating the Forward solenoid 88a. This renders the escapement mechanism described previously effective to increment the sound head in relation to the magnetic belt by successive increments that is termed a measure review.

Movement of the sound head in transcribing unit 5 in the reverse direction in relation to the magnetic belt 2 is effected by depressing the left portion of foot control 8 thereby transferring the Reverse switch contacts and completing a circuit through connection 8 to transistor T2 to activate the Reverse solenoid 89a.

With an option, continued incrementing of the sound head in either the selected forward or reverse directions is repeated continuously by continued depression of the foot control 8 in the required direction.

Automatic Recall Feature

The transcribing apparatus and the dictating apparatus, if desired, incorporates means for automatically repositioning the sound head in relation to the magnetic belt 2 each time that the foot control is released following a Playback operation in order to pick up the last several words of dictation when the equipment is started again. The recall is adjustable by means of the recall lever 19, FIG. 4, anywhere from a No Recall condition to approximately five (5) words.

Figure 5:
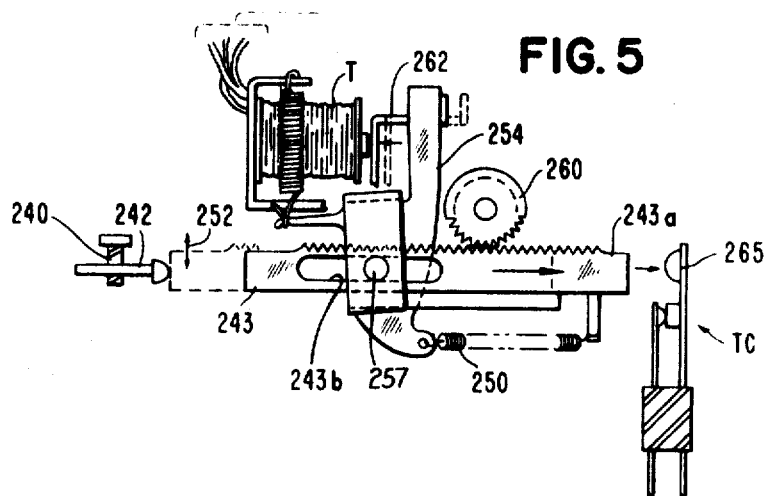
FIG. 5 shows an automatic recall rack and associated components for the transcribing unit of FIG. 4.

The recall feature includes various structures shown in FIG. 5 together with electrical circuits in FIG. 7a.

The operator usually adjusts recall lever 19 prior to a transcribing operation and readjusts as desired during the course of transcribing operations. As discussed in the Ridings, et al case this moves an adjustable stop 242 arranged for cooperation with a timer rack 243, FIG. 5. Rack 243 is arranged for movement left to right and right to left with a spring member 250 maintaining rack 243 generally to the left against stop 242. Positioned adjacent extremity 243a of rack 243 is a set of timer contacts TC, shown also in the circuit of FIG. 7a. Rack 243 is also movable slightly upwardly and downwardly as indicated by arrow 252, FIG. 5, under control of a timer magnet T. This is effected by movement of a timer arm 254 engaging rack 243 in slot 243b by pin 256. Rack 243 is positioned adjacent a driving gear 260 for driving from left to right during its operation.

Considering the structural aspects first, rack 243 normally rests against stop 242 and by energization of timer magnet T through armature 262 is moved upwardly under control of arm 254 and pin 256 into engagement with gear 260. Adjustment of recall lever 19 moves rack 243 closer or further away from contact assembly TC. Contact assembly TC is incorporated in a driving circuit for motor 105a to drive the motor and hence the sound head in relation to magnetic belt 2 a varying distance depending upon the time it takes rack 243 to encounter operating strap 265 of the timer contact assembly TC and open contacts TC.

Recall Circuits and Operation

It is assumed that recall lever 19 is set at a position other than a "Recall" position which moves stop 242 leftwardly and due to the bias exerted by spring 250 moves rack 243 away from strip 265 of contact assembly TC. Conditions are now established for reversing the direction of drive or rotation of motor 105a, thereby reversing the scanning of the sound head in relation to the magnetic belt 2 a desired number of words as determined by the setting of recall lever 19. It is assumed that the transcriber has been operating unit 5 in the Playback mode and has accordingly had the right side of foot control 8 depressed to transfer the playback contacts 1 and 2 and supply potential to energize relays R and RR and to supply the operating potential of 16.0 volts, nominal, to the upper portion of motor 105a to thereby cause its rotation in the forward direction. Since 10.0 volts is also applied to the lower side of motor 105a at this time, an effective potential of 6.0 volts exists across the motor.

As soon as the transcriber releases foot control 8, the playback switch assemblies SW1 and SW2 return to their normally closed conditions shown in FIG. 7a. Not SW1 provides ground to the circuits for relays R and RR which would normally deenergize them. However, relay R continues to hold through its own R-1 contacts and the timer contacts TC. A circuit now exists from the Automatic Off contacts ($\overline{AO}$) through the R-2 contacts, left-center of FIG. 77a, now transferred, terminal 9 of foot control 8, playback contacts 2, terminal 12 of foot control 8, automatic erase contacts AE-2, Phase 2 (PH-2) contacts to the lower circuit connection of motor 105a. The upper side of motor 105a is connected to ground through the Automatic Erase contacts $\overline{AE1}$, the R-3 contacts presently closed, transistor T3, connector 11 in foot control 8 and Not switch 1 ($\overline{SW1}$) by connector 7 to ground. The path through transistor T3 also serves as a ground connection for the upper side of the timer coil T.

Motor Startup Action, Deactivation of Regulating Circuit, and Reverse Drive

Conditions are now established for motor 105a to drive belt 2 in the reverse direction by the connection just described. The startup action of the motor is comparable to the action described in connection with belt loading and phasing in that the full power supply potential is applied across the motor and the regulating circuit is rendered ineffective at this time. The disconnection of the motor regulating circuit in FIG. 7b during the belt loading and phasing operation was performed by transfer of phasing contact Ph-2. In the present situation, the motor-regulating circuit is not actually disconnected but is rendered ineffective by the following action. Motor 105a now has ground connected to the upper side and the maximum potential available, that is, in the range of 16.0 to 18.0 volts, is applied to the lower side. Motor 105a drives tachometer 273 which develops pulses in a manner comparable to those developed during forward rotation of the motor and these are applied to the regulating circuit in the conventional manner. However, with the reversal of potentials to motor 105a the output signals developed from transistors T15 and T16 are actually ineffective co regulate motor 105a and motor 105a drives at the maximum speed at which it is capable due to the applied potentials.

Motor 105a now rotates in the reverse direction to drive gear 260 counterclockwise, FIG. 5. With the energization of the timer magnet T, rack 243 is moved into engagement with gear 260 by arm 254 due to the connection with stud 256. Motor 105a and gear 260 drive rack 243 rapidly toward contact strap 265 of the timer contacts TC. As soon as rack 243 moves sufficiently far enough to operate against contact strap 265 and open the timer contacts TC, relay R becomes deenergized. This transfers all of the R contacts. R-1 opens the holding circuit to relay R. The opening of contacts R-2 breaks the circuit for the 18.0-volt potential to the lower side of motor 105a while the opening of contacts R-3 breaks the ground circuit for both motor 105a and timer T. Motor 105a ceases operation and timer T deenergizes to allow rack 243 to drop out of engagement with gear 260. Spring 250 restores rack 243 against stop 242 in readiness for another automatic word recall operation.

Termination of Automatic Recall Operation Prior to Its Normal Completion

Under some circumstances, the transcriber may wish to continue with the Playback operation and not have the automatic recall feature completely operative. The recall operation may be terminated by the transcriber by an immediate further depression of the right side of foot control 8 which again transfers the playback switch assemblies SW1 and SW2 to their playback condition. When foot control 8 is operated prior to the completion of the automatic recall operation, timer T still has a large potential tending to keep it energized. This potential is in the range of 36 volts that is available at the Zener diode 168. Zener diode 168 normal drop is about 18 volts but with a 36-volt potential, a circuit is completed to quickly stop the motor through $\overline{AE1}$, R3, and PH3 that form a short circuit around the motor armature. Also, an 18-volt potential through transistor T6 controls transistor T7 to discharge a capacitor 169 in the base-emitter path of transistor T5 thereby maintaining relay RR deenergized to mute the audio circuits until the structures and circuits have settled down.

From the foregoing description, it is seen that a number of unique structures and circuits combine to establish efficient transcribing operations.

Motor Action During an Automatic Erase Operation

When the transcriber has completed transcribing the belt in the transcriber unit, it is customary for her to operate the automatic erase button 40a, FIG. 4, which then renders the automatic erase mechanisms including a permanent magnet effective for one complete revolution to erase the belt. During this time it is desirable that motor 105a rotate belt 2 in the forward direction at high speeds. Circuit connections are completed in FIGS. 7a and 7b. The maximum potential available in the unit is applied across motor 105a and the motor-regulating circuit in FIG. 7b is rendered ineffective. The action is similar to that taking place during belt loading and phasing operation. In this case, transfer of the automatic erase contacts AE-2, FIG. 7a, disconnect the motor-regulating circuit from the lower side of motor 105a and connect instead ground by resistor 271 and the ground line 272. Accordingly, motor 105a operates at high speeds to drive belt 2 in the forward direction until completion of the automatic erase operation.

Belt Unloading and Restoration of Magnetic Sound Head

Upon completion of the transcription and erasure of the belt, the operator ordinarily unloads the belt by movement of lever 10b to the right, FIG. 4. This transfers all of the phasing contacts PH-1 through PH-4 in FIG. 7a to the opposite state from that shown. The belt unloading action establishes conditions for restoring the sound head to the initial margin in readiness for insertion of another belt. The sound head assembly is connected with a head restore driving lead scre that is driven by motor 105a at high speed. Part of the potential is applied to the upper side of motor 105a through the phasing contacts Ph-1, now transferred, FIG. 7a, while a ground connection is made to the lower side of motor 105a through the phasing contacts Ph-2, FIG. 7a. Motor 105a is thereupon energized to operate at a high speed until the head restore contacts HR-1, FIG. 7a are opened by movement of the sound head to the initial margin. The regulating circuit is inactive at this time due to transfer of phasing contacts PH-2.

The motor contacts, startup and regulating arrangements simplify operation of the unit. The rapid startup times achieved eliminate the need for a continuously running motor and enable operation without the clutch assembly usually required in apparatus of this nature. This feature also applies to the dictation unit.

Transcriber logic

Figure 10:
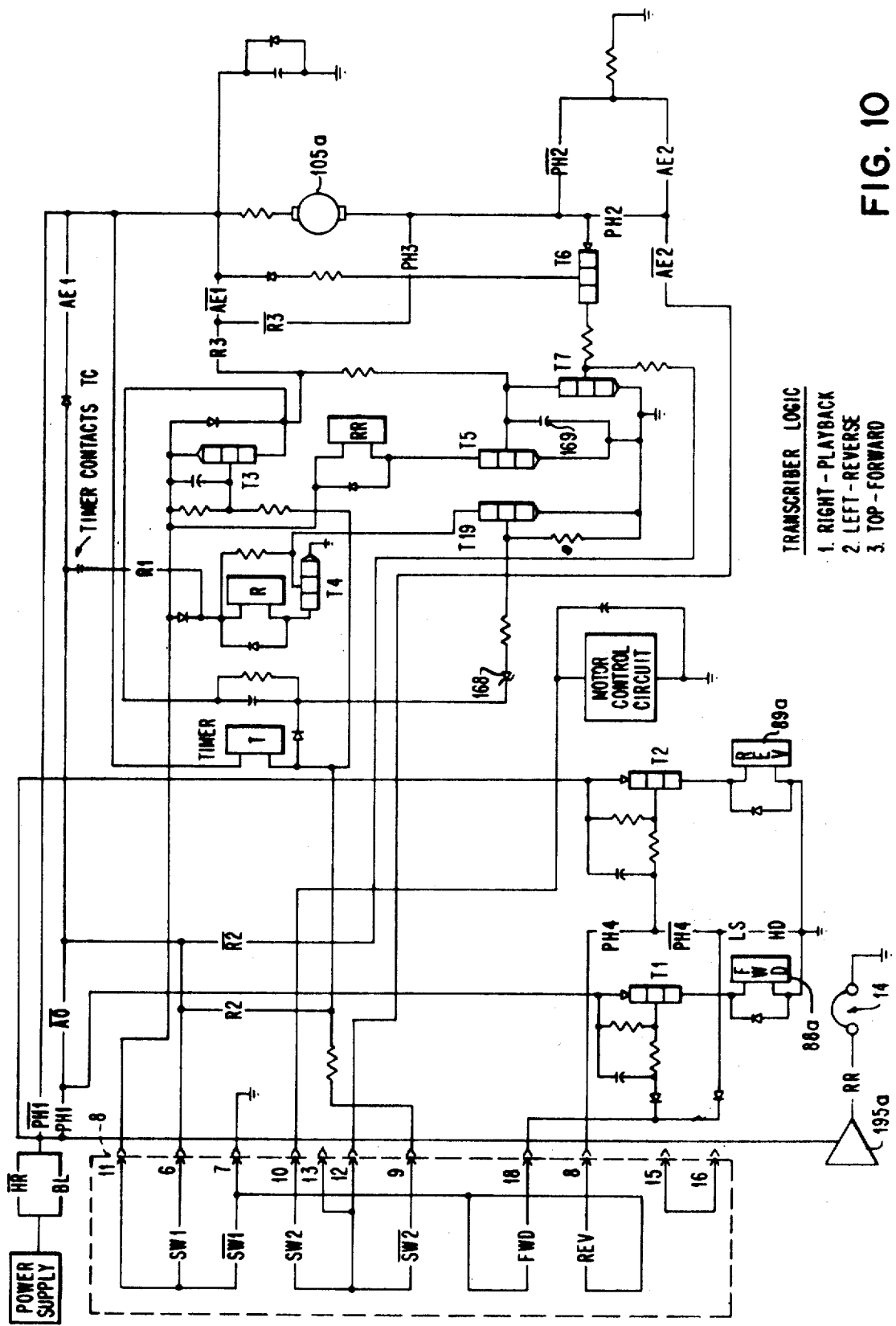
FIG. 10 is a logic diagram for the circuit actions in the transcribing unit of FIG. 4.

FIG. 10 illustrates the logic involved in operation of the transcriber circuits shown in detail in FIGS. 7a and 7b. The logic is clarified by consideration of a typical transcribing operation. The logic includes the foot control 8 with switch 1 and 2 contacts (SW1 and SW2) that are movable by depression of foot control 8 on the right side. The foot control includes Forward (FWD) and Reverse (REV) contacts for operating Forward and Reverse solenoids 88a and 89a under control of associated transistors T1 and T2. The logic further includes timer T, timer contacts TC, an R relay and associated transistor T4 controlled by transistor T19, an RR relay controlled by transistor T5 that is in turn selectively controlled by transistors T6 and T7 and motor 105a together with a motor control circuit for regulating its speed in a selected speed range.

A typical sequence of operations involves unloading a belt and reloading a new belt to continue transcription. When a belt is ejected from transcribing unit 5, the sound head is usually away from the home margin position as reflected by Head Restore (HR) contacts being closed as indicated with the designation Not Head Restore ($\overline{HR}$). Such contacts being closed complete a circuit through Not Phase 1 contacts to drive motor 105a for restoring sound head to the initial margin location. When the transcriber inserts a belt into the unit, the belt load (BL) contacts close to further supply driving power to motor 105a through the Not Phase 1 contacts. This also conditions amplifier stage 195a for operation when the RR relay becomes energized later.

Immediately following insertion of a belt in the unit, the lead screw is phased to a zero condition and aperture 2a of belt 2 is sensed to establish a desired initial relationship between sound head 82 and belt 2 in the unit. The belt loading and phasing mechanisms are latched with all of the phase contacts in an inactive or logical Not condition and retained in such condition until the lead screw is phased and the belt aperture is sensed. The mechanisms are reset upon such occurrence under control of a latch member operated by the Reverse solenoid 89a. Closure of the lead screw (LS) contacts indicating a lead screw zero phase condition and the Hole Detect (HD) contact complete a circuit to ground for biasing transistor T2 on to energize the Reverse solenoid 89a, thereby unlatching the phasing mechanisms and indicating that the unit is ready for operation. This moves all of the Phase contacts to their phased condition.

To operate the unit, the transcriber depresses foot control 8 on the right side which transfers switch assemblies SW1 and SW2 to supply power to the various circuits of the machine. Power is from the power supply through the belt load (BL) contacts, Phase 1 (PH1) contacts, Automatic Off ($\overline{AO}$), terminal 6 of foot control 8, switch 1, and terminal 11 to the upper side of relays R and RR, rendering the latter relays active and transferring the associated contacts. The relay RR contacts complete the amplifier circuits to head set 14. Power is also supplied from terminal 8, R3, and $\overline{AE-1}$ to the upper side of motor 105a. The lower side of the motor circuit is completed through the automatic erase contacts $\overline{AE2}$ through switch SW2, connector 10, to the motor control circuit. Motor 105a thereupon operates to drive sound head in unit 5 in relation to magnetic belt 2 in order to trace a helical path on the belt.

During operation, the transcriber may wish to scan the belt forwardly or reversely and does so by appropriate depression of foot control 8. A Forward scan is initiated by depression of the top of foot control 8 closing the forward (FWD) contacts to terminal 18 and driving transistor T1 to energize Forward solenoid 88a. This operates the escapement pawl assemblies described elsewhere. Scanning of the sound head in a reverse direction with respect to magnetic belt 2 is effected by depression of the left side of foot control 8 which closes the reverse contacts and biases transistor T2 to operate the Reverse solenoid 89a.

The unit has an automatic recall feature that is controlled by movement of automatic recall lever 19 on the front of the unit through a range from No recall (0) to approximately five (5) words of recall. While in a Playback mode with switches SW1 and SW2 transferred, the circuits of the equipment are prepared to supply an automatic recall operation upon termination of the Playback.

Relay R is held through its own R1 contacts and timer contacts TC that are controlled by the timer rack 243, FIG. 16.

Assuming that the automatic recall lever 19 is set at a position other than the zero (0) position, the operation of the automatic recall feature is as follows. Release of foot control 8 establishes the Not switch 1 and Not switch 2 conditions S($\overline{SW1}$ and $\overline{SW2}$) and reverses connections to motor 105a to reverse the direction of driving of motor 105a in order to drive belt 2 in a reverse direction in relation to the sound head. Also, this rotates gear 260, FIG. 16, to drive rack 243 toward strap 265 of contact assembly T–1 in order to open contact assembly TC and terminate the recall operation. The extent of recall is determined by the relative location of rack 243 in relation to strap 265 as determined by the setting of stop 242 that is directly controlled by movement of automatic recall lever 19.

The circuit connections for reversing the rotation of motor 105a are from power supply, belt load (BL) contacts, Phase 1 (PH1), Not Automatic Off ($\overline{AO}$), R2 contacts, Not Switch 2 ($\overline{SW2}$), connection 12, Not Automatic Erase contacts $\overline{AE2}$, Phase 2 contacts to the bottom of motor 105a. This supplies approximately 18.0 volts on this side of the motor for driving purposes. The opposite side of the motor is grounded through the automatic erase contacts ($\overline{AE1}$), the R3 contacts, transistor T3 connector 11, Not Switch 1 ($\overline{SW1}$), connector 7 to ground. Ground is also applied to the timer coil which through the mechanisms shown in FIG. 16 moves rack 243 into engagement with gear 260. Opening of the timer contacts TC drops relay R and timer T. In this manner a desired amount of recall is automatically obtained in the equipment.

If the operator wishes to terminate the timer operation prior to its normal completion, she again depresses foot control 8 to transfer the playback switch contacts SW1 and SW2 into a Playback mode. Such transfer of the SW1 and SW2 contacts opens the circuits for reverse driving of motor 105a, terminates the energizing circuit for the timer, and through transistor T19 drops relay R to permit the circuits to settle down. Relay R is then able after a predetermined length of time to become energized again as in a normal Playback mode of operation. Transistors T5, T6, and T7 are effective to control the relay RR that in turn controls muting of the audio circuits.

Dictator Logic

The principles of motor action during startup time, the connection of the regulating circuit in and out of the primary circuit as required, the motor reversal connections, and other motor actions are essentially identical in the dictator unit, the circuits of which are not shown in detail herein. Reference is made to the Fackler, et al. application for a detailed description of the dictating unit circuits. However, some understanding of the motor action and control and regulation in the dictator unit can be derived by reference to FIG. 9 in the present case.

An interesting difference exists between the circuits of the transcriber unit shown in detail and FIGS. 7a and 7b as well as in FIG. 10, and the dictator unit shown in FIG. 9. Under ordinary circumstances, the transcriber unit is found in offices where the conventional AC power supply is available from outlets, as required. Ordinarily, therefore, no need exists for battery operation of the transcriber unit. However, the dictator unit may be used with an AC power supply in the office, in some circumstances, and with a self-contained battery supply, under other circumstances. In either case, the dictator unit is designed so that the available potential, whether from an AC outlet or from a battery, is not applied to the machine circuits, including the motor circuit, until actually required by the user of the equipment. The +18 volt PS terminal in FIG. 9 is representative of a rectified AC power supply or a battery supply, as the case may be. A review of the logic and the circuit connections in FIG. 9 will show that the potential available from this terminal is not applied under any circumstances unless one of the switching elements in the microphone 3 is transferred to the proper condition. As an example, a depression of the Record bar completes a circuit connection by terminal 20 to energize various circuit elements shown including, as an example, the oscillator stage. Also, through the record switch, the circuit is completed from terminal 12 to other circuit elements including motor 105. This is in contrast with the transcriber unit described in detail previously wherein at least some portions of the circuits are energized even though the transcriber unit is not in active use. As an example, when the unit is plugged into the power outlet, the amplifier stages including transistors T17 and T18 and the integrator circuit stage 195a in FIG. 7b are energized.

While the motor action and the regulating circuit action in the dictator unit is comparable to that in the transcriber unit, the startup of motor 105, FIG. 9, is somewhat different in that motor 105 startup time is slightly longer than the startup time existing in the transcriber unit. This is due primarily to the fact that the transcriber regulating circuit, FIG. 7b, is ready to perform its regulating function as soon as the belt loading and phasing operations are completed. In the dictator unit, on the other hand, the regulating stages are inactive until the Record bar is depressed. A regulating circuit is used in the dictator unit that is practically identical with that shown in FIG. 7b. The difference in operation can be realized from a review of the action of transistor T14 that was previously described in connection with motor startup. In the transcriber unit, the potential at terminal 290 is essentially equal to the reference potential at 291 thereby making it possible to saturate transistors T15 and T16 immediately upon depression of the foot control 8, FIG. 7a. In the dictator unit, however, since potentials are not available until closure of the appropriate switches in microphone 3, a somewhat longer time is required before transistors T15 and T16 reach the saturation level.

The detailed circuits for the dictating unit, fully described in the Fackler, et al., case Ser. No. 699,259, are somewhat simplified in the logic diagram of FIG. 9. Only the major components involved in operation of the dictator unit are shown in FIG. 9. These include microphone 3 shown in the dashed box so designated and various interconnecting terminals. A complete sequence of operations of the dictator unit will clarify the logic involved.

In FIG. 9, loading of a magnetic belt in the unit closes the belt load contacts (BL). This completes a circuit from the Power source (PS) through the Not Head Restore ($\overline{HR}$) and Not Phase 4 ($\overline{PH4}$) contacts to drive motor 105. Mechanisms associated with belt loading are latched to prevent dictation until the lead screw has reached a zero phased condition and the aperture 2a, FIG. 2, in belt 2 is sensed by the apparatus. The latching mechanism is released by operation of Reverse solenoid 89 that is driven by transistor Q23. Rotation of lead screw 100 to a zero condition closes Lead Screw contacts (LS). Sensing of aperture 2a in belt 2 closes the Hole Detect (HD) contacts. A circuit to ground is thereby completed through the LS and HD contacts, through Not Phase 2 to the base of transistor Q23 to saturate it and energize Reverse solenoid 89 to release the latching mechanism and indicate that the phasing operation has been completed.

A Dictate mode is established by positioning of the mode knob and switch assembly 20 to the center or Dictate position which prepares the logic for recognition of the Record (REC) status. Mode control button 32 on microphone 3 is also moved to the upper or Record position to prepare the machine circuits for recording of dictation. When the operator of the unit desires to dictate, he depresses dictate bar 33 that completes a number of circuits as follows. A circuit exists from Power Supply (PS) through Belt Load (BL) contacts, Not Auto-Off ($\overline{AO}$), through Phase 1 (PH1), Connector 6, Dictate Bar (BAR), and thence to several circuits in FIG. 9.

Power is applied through connector 20 to pick relay RR that completes a circuit to the magnetic head for recording signals. This also activates the oscillator for bias and erase signals.

A parallel circuit exists through the Record (REC) logic, connector 12 to the base of transistor 29 in connection with energizing relay RR and also to the top of motor 105 through Phase 4 (PH4) contacts, diode 150, and coil L-1 for driving belt and head mechanisms to trace a helical path on belt 2.

During dictation, movement of the Letter-Secretary button 39 to the Letter position (LET), energizes the Letter solenoid 190 to mark a letter indication on index slip 15. Movement of button 39 to the lower position closes Secretary (SEC) contacts to operate the Secretary solenoid 191, thereby making a Secretary Instruction mark on index slip 15.

During dictation, the fact that the equipment is in a Record mode is indicated by the energization of lamp 35 on microphone 3.

If it is desired to review material previously dictated, the dictator moves mode button 32, FIG. 1a, to the lowest position against the spring bias which closes a connection to ground through connectors 5 and 7, the Review switches (REV), connector 8, Phase 2 contacts (PH2) to transistor Q23 to energize the Reverse solenoid 89 and backstep head 82. Optionally, a repeated backstepping may be obtained by continued depression of button 32 to the Review position.

Stepping of head 82 forwardly in relation to belt 2 is accomplished by movement of button 38 on microphone 3 to the upper position. This completes logic through the Forward (FWD) contacts, connection 18, to the base of transistor Q22 for energizing Forward solenoid 88.

The signals during recording are provided from microphone transducer 36 to the machine amplifier circuits from terminals 1 and 3.

In order to listen to previously dictated material, the dictator moves mode button 32 to the center position which operates Listen (LIS) logic. Closure of the Listen contacts (LIS 1 and LIS 2) completes several circuits. The circuit from LIS 1 through connector 12 biases transistor Q9 on to activate motor circuit transistors Q2—Q8, the second regulator, and energize motor 105. Another circuit activates Playback relay PR, relay RP, the power amplifier (B stage), through Not telephone 3 ($\overline{TEL\ 3}$), connector 11, and Listen 2 (LIS 2).

With battery, power for the preamplifier is derived from the third regulator stage and controlled by switch LIS 1. With AC, power comes from $\overline{AO}$ contact.

During the operation of motor 105, regulation is provided by the motor control block under control of the second regulator block. A third regulator circuit is also provided.

Dynamic braking is provided by transistor Q1 which conducts upon termination of dictation and listening and that serves as an effective short circuit across motor 105 to bring motor 105 rapidly to a standby condition. During dictation, the preamplifier stages (PREAMPL) are activated from the Not Automatic Off connection ($\overline{AO}$). During a Listen mode, the connection to the oscillator is effectively open since Dictate bar 33 is not depressed.

The logic includes buzzer 166 that is operated as an example by the End of Belt (EOB) contact.

While the invention has been particularly shown and described with reference to several embodiments, it will be understood by those skilled in the art that various changes in form and detail may be made without departing from the spirit and scope of the invention.

What we claim is:
1. A control arrangement for a motor, comprising:
   a primary source of potential having a value higher than a predetermined value necessary to operate said motor at a desired speed;
   a regulating circuit, said regulating circuit being arranged for selective interconnection between said motor and said primary source of potential, said regulating circuit including an output stage that is connected in series with said motor when interconnection of said regulating circuit between said primary source and said motor is established, and said output stage being operable in a saturation mode and a regulating mode with respect to said motor
   mode control means operable in a first mode to connect said motor directly to said primary source of potential to establish unregulated high speed operation of said motor for an extended interval of time and operable in a second mode to interconnect said regulating circuit between said motor and said primary source of potential;

conditioning means in said regulating circuit operable in a saturation mode when said regulating circuit is first interconnected to condition said output stage in saturation to establish unregulated high speed operation of said motor only for an interval of time required for said motor to reach a predetermined speed, and operable thereafter in a regulating mode when said predetermined speed is reached to condition said output stage at voltage and current levels less than saturation to establish regulated operation of said motor at said predetermined speed;

certain means preferably driven by said motor at a high rate of speed in a first direction, said certain means also requiring driving in a reverse direction at a high rate of speed, and other means preferably driven by said motor at a regulated speed, all of said certain and other means being directly drivingly connected to said motor;

operator-controlled facilities for initiating operation of each of said means as required;

means for distinguishing among each of said initiated operations and operating said mode control means to establish said first mode for driving said certain means in an unregulated high speed operation and to establish said second mode for driving said other means under control of said regulating circuit;

means for reversing the connection of potential and ground across said motor to establish said reverse driving of said certain means; and means also interconnecting said regulating circuit with said motor during said first mode of operation, said regulating circuit being rendered ineffective due to the reverse potential applied across said moor.